United States Patent [19]

Feliz

[11] Patent Number: 4,566,551

[45] Date of Patent: Jan. 28, 1986

[54] STAIR-CLIMBING CONVEYANCE

[76] Inventor: Jack M. Feliz, 2110 Southridge Dr., Palm Springs, Calif. 92264

[21] Appl. No.: 527,766

[22] Filed: Aug. 30, 1983

[51] Int. Cl.4 .............................................. B62D 55/04
[52] U.S. Cl. ...................................... 180/9.1; 180/9.3; 180/907; 280/DIG. 10
[58] Field of Search ....................... 180/9.1, 9.26, 9.28, 180/9.3, 8.2, 6.5, 907; 280/5.22, DIG. 10

[56] References Cited

U.S. PATENT DOCUMENTS

| | | | |
|---|---|---|---|
| 3,231,290 | 1/1966 | Weyer | 280/5.22 |
| 3,288,234 | 11/1966 | Feliz | 280/DIG. 10 |
| 3,292,722 | 12/1966 | Bamberg | 280/DIG. 10 |
| 3,346,062 | 10/1967 | Richison | 180/9.3 X |
| 4,222,449 | 9/1980 | Feliz | 280/DIG. 10 |

Primary Examiner—John A. Pekar
Attorney, Agent, or Firm—Harris, Kern, Wallen & Tinsley

[57] ABSTRACT

An improved power driven conveyance intended primarily for use by handicapped persons or invalids. A power means to drive the conveyance on level surfaces at normal pedestrian speeds and or to ascend or descend conventional or irregular stairways at reduced speed and increased torque. The invention further contains a self-leveling chair which automatically maintains the occupant in a level seated position regardless of the inclined position assumed by the conveyance frame, thereby contributing to the stability of the conveyance and the safety of the occupant. A fail safe tractor belt means is provided to insure a positive grip between the stair treads and the conveyance. Frontal and rear auxiliary tractor belt units adjust the inclination of the main tractor belts to alignment with the angularity of the stairways and landings.

24 Claims, 17 Drawing Figures

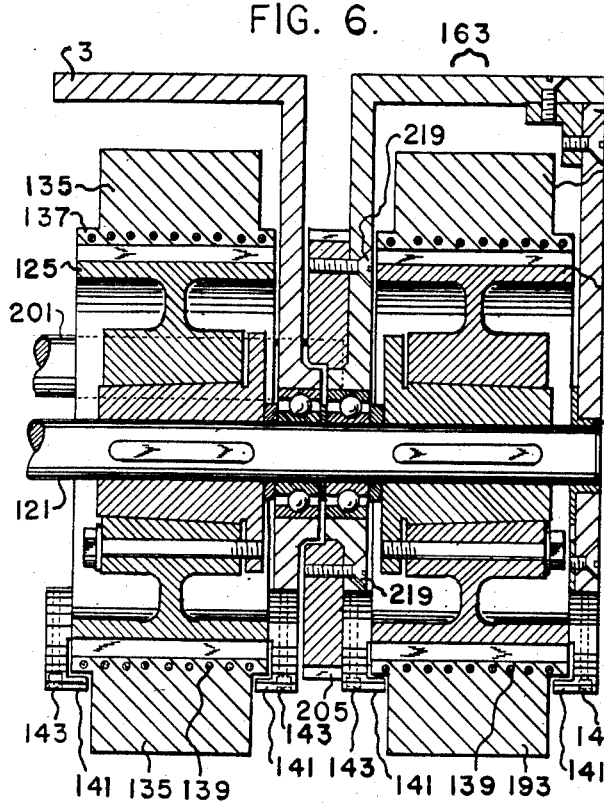
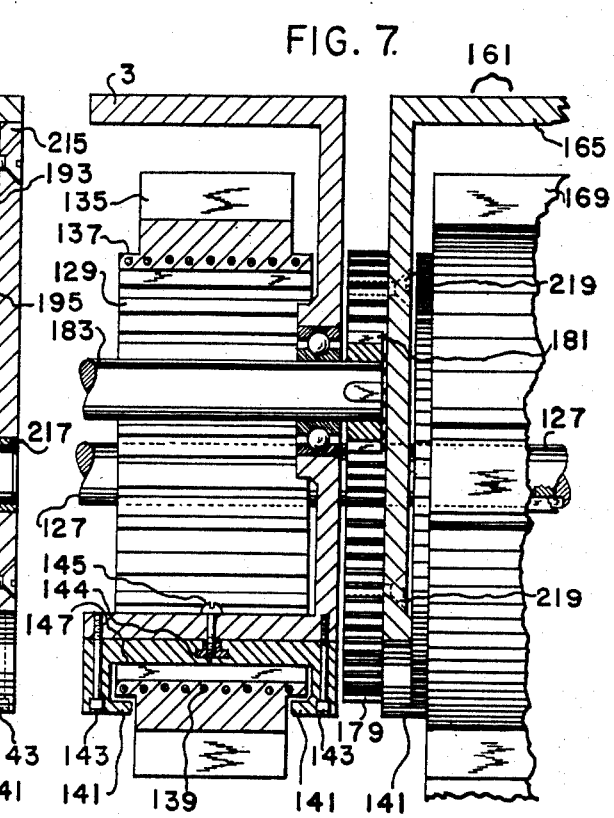
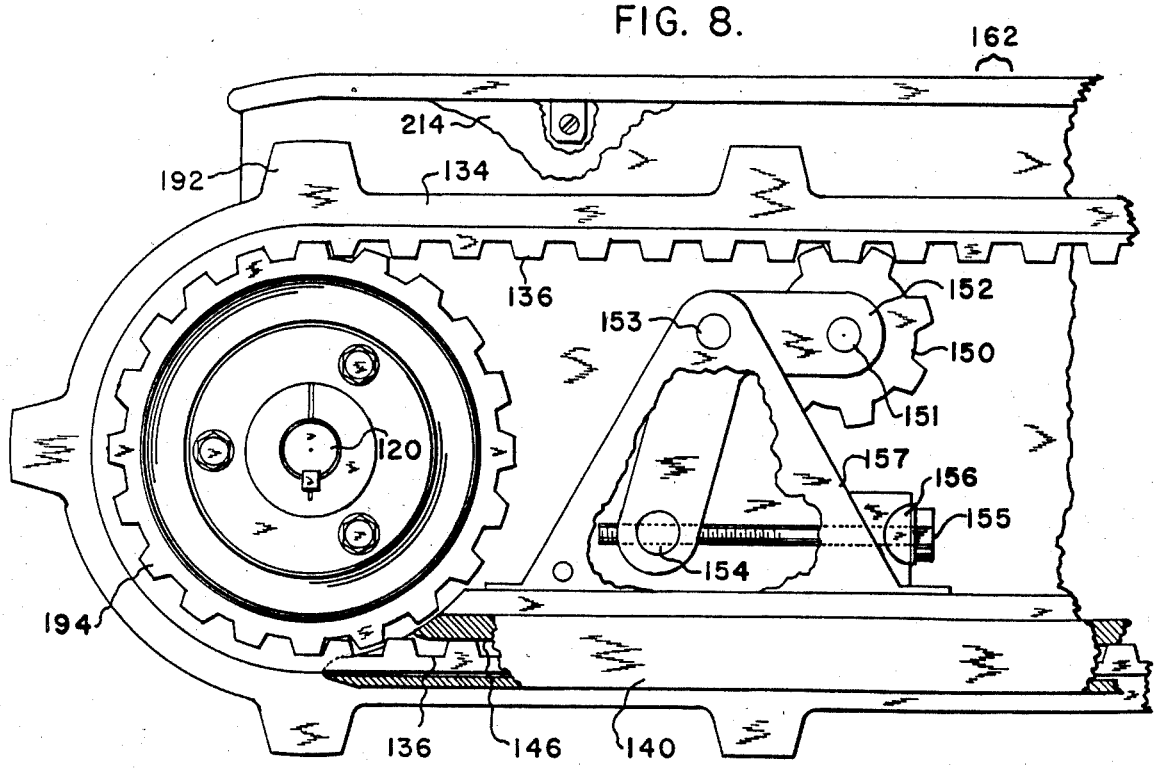

STAIR-CLIMBING CONVEYANCE

REFERENCE TO RELATED DISCLOSURE

I incorporate herein by reference my U.S. Pat. No. 3,288,234 issued Nov. 29, 1966.

BACKGROUND OF INVENTION

This invention relates to the improvement of a conveyance for use by handicapped persons or invalids.

In known types of stair-climbing conveyances an attendant is required to assist the occupant in ascending or descending the stairs. In other stair-climbing conveyances the occupant is confined to the use of a permanently installed inclined chairlift and then is required to transfer to a conventional wheel chair at the upper and lower stair landings. Other stair-climbing conveyances are very difficult to change from a level terrain mode to a stair climbing mode.

This conveyance is absolutely self-sustaining and does not require the installation of special ramps, mechandical contrivances or electrical outlets in buildings to perform its travel on a horizontal surface, or ascending and descending stairs, or climbing into and out of an automobile or other longhaul carriers.

SUMMARY AND OBJECTS OF INVENTION

In summary the chief aim of my invention is to provide a conveyance that will circumvent the above-mentioned problems, in addition to providing other amenities as will be noted henceforth. Another aim of my invention is to provide a self-contained conveyance which will enable a handicapped or invalid to cope safely with additional problems encountered, for example, as moving the conveyance into a van-type automobile or a conventional automobile with one half of the front seat removed, a plane or other means of transportation in going to or from work or pleasure, in ascending or descending stairways or curbs; in traversing obstructions which may be encountered at home, in a factory or out of doors. Another aim is to provide ready access to shelves, sinks or cabinets at elevations beyond ordinary reach from conventional wheelchairs.

Another aim of my invention is to secure the foregoing advantages in a conveyance which is power driven by a pair of drive trains wherein the single reduction worm gear device motor for each independent train is intermeshed with non-slip timing belts to the drive wheel for propulsion on the level surface mode and is further intermeshed by an additional timing belt connected to a double reduction worm gear reductor for the stair traversing mode, thus limiting the need for an additional motor for each mode. This interlocked drive means also permits steering the conveyance while in a stair traversing mode and further prevents a disaster from occurring to the occupant when shifting from the level surface mode to the stair traversing mode. In other words, there is no possibility that either the right or left drive trains can be disengaged to cause a runaway conveyance.

Another aim of my invention is to provide a low friction tractor belt guide that will restrain the belts while steering the conveyance during transit of the stairs and also provides a low friction runner that bears the weight of occupant and chair down on the lower run of the low friction faces of the tractor belts.

Another aim of my invention is to provide a fail safe tractor belt means wherein complete safety on the stairs is accomplished by the use of non-marking, slip resistant, neoprene cleated belts vulcanized to the exterior of internally grooved, slip proof, timing belts in turn driven by timing belt pulleys thence intermeshed by timing belts and reduction worm gears as previously mentioned, this system further provides safety to the occupant in the event of a power failure incident to stair ascension or descension. The worm gearing is self locking or irreversible, and will be held, against retrogression, on the stairs.

Another aim of my invention is to provide two independent drive systems for purposes of steering, and turning completely around within the diagonal distance of the frame, which also provides another fail safe means, in the event of a mechanical failure to one drive system, the other system will restrain an uncontrolled descent.

Another aim of my invention is to provide control switches which are energized against a spring load and should anything happen to the occupant the mere removal of the fingers will stop the conveyance instantaneously.

Another aim of my invention is to provide an auxiliary tractor belt means to permit a smooth controlled descent to the upper stair landing as the center of gravity of the conveyance passes from the inclined stairs to the horizontal landing thereby preventing jostling and jouncing the occupant.

Another aim of my invention is to permit the occupant and conveyance to pass through narrow doors in older homes and bathrooms.

Another aim of my invention is to provide an automatically stabilized chair that will always maintain the chair in a vertical position during the transitions of landings and stairways, traveling either forward or backward and ascending or descending stairs. The automatic seat stabilization is a great asset to the occupant for it offers a strong feeling of security while freeing the occupant of the task of continuously compensating for his state of balance while negotiating stairs and landings and other obstructions.

Another aim of my invention is to provide a means to retract or extend the tractor belt assembly or the drive and caster wheel assembly, during mode changes.

The foregoing objects, advantages, features and results of the present invention, together with various other objects, advantages, features and results thereof which will be evident to those skilled in the art to which the invention relates in the light of this disclosure, may be achieved with the exemplary embodiments of the invention illustrated in the accompanying drawings and described in detail hereafter.

DESCRIPTION OF DRAWINGS

In the drawings:

FIG. 6 is an enlarged fragmentary vertical section taken as indicated along the angled arrows VI—VI in FIG. 5 illustrating the main drive shaft, bearings, and supporting channel bars, main and auxiliary timing belts and sprockets and belt guides;

FIG. 7 is an enlarged fragmentary vertical section taken as indicated along the angled arrows VII—VII in FIG. 5, illustrating the auxiliary drive shaft, supporting bearing and channel bar, pinion and spur gear driving the auxiliary tractor belt until and split tractor belt guides;

FIG. 8 is an enlarged fragmentary side elevational view with cover plate removed and parts broken away, taken as indicated along the angled arrows VIII—VIII in FIG. 5, illustrating the tractor belt and sprocket, belt tensioning device and low friction tractor belt guide and runner;

DESCRIPTION OF EXEMPLARY EMBODIMENTS OF THE INVENTION

Like parts of the corresponding assemblies will be identified by even numerals on the left side and the succeeding odd numeral on the right side. There may be a few instances where one or the other numeral of a pair may not be shown due to a particular drawing not illustrating both sides of the conveyance parts.

Figure 1:
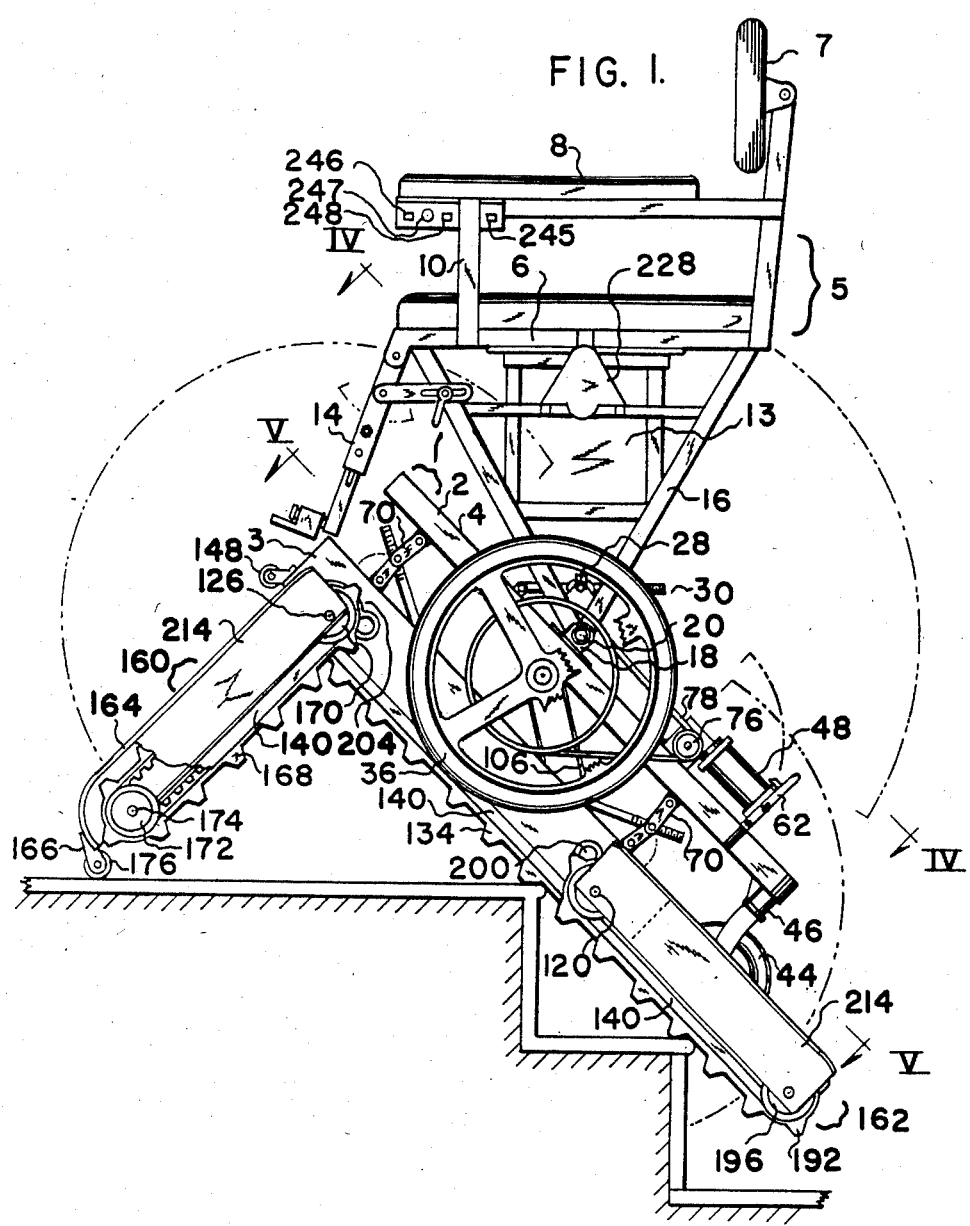
FIG. 1 is a side elevational view of the present invention, illustrating the conveyance in a stair-climbing mode and beginning the transition to a level surface mode.
Figure 2:
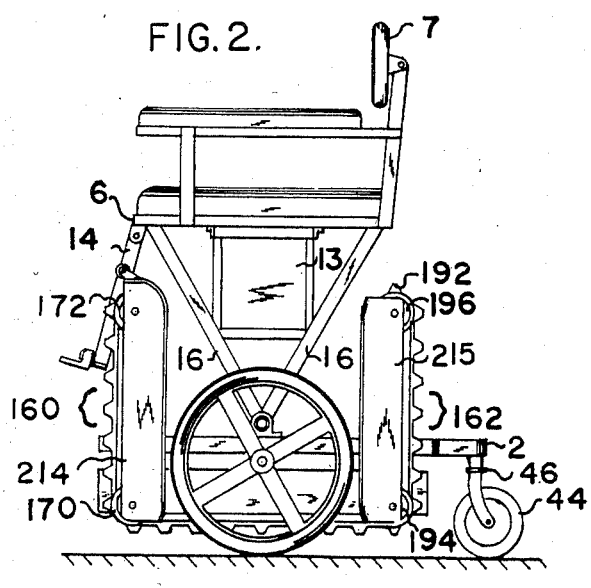
FIG. 2 is a skeletal side elevational view of the conveyance, illustrating the auxiliary tractor belts folded and the main tractor belt assembly retracted and the drive and caster wheels extended for traveling on level surfaces.
Figure 3:
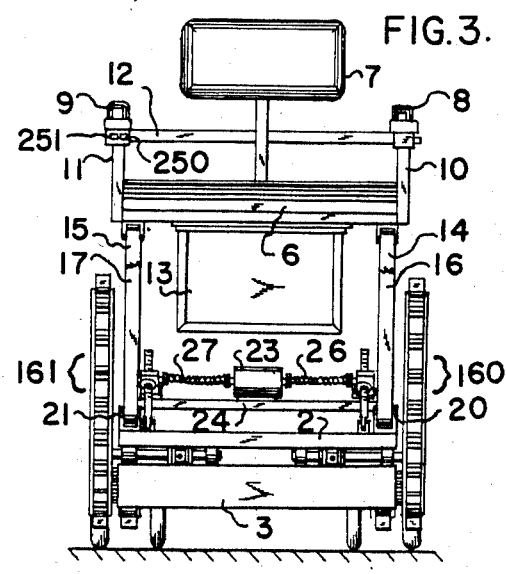
FIG. 3 is a skeletal front elevational view of the conveyance as it appears when viewed from the left of FIG. 2, illustrating seat stabilizing assembly, drive and caster wheels extended and tractor units retracted.

Referring to FIGS. 1-3 of the drawings, the conveyance of my invention comprises a platform 1 which is rectangular in plan and which has an upper frame 2 constructed of angle section bar metal or other lightweight materials with the hollows of said bars facing inwardly and a lower frame 3 constructed of channel section bar metal or other light weight material with the hollows of said bars facing inwardly. A cover plate 4 (See FIG. 4) is secured to the top of frame 2 and acts as a foot rest. Mounted on platform 1 is a chair 5, having a seat frame 6 (See FIGS. 1, 2 and 3) which is rectangular and fashioned from angle section bar metal or other strong lightweight material. As herein exemplified the seat frame is spanned by a wooden insert supporting a foam rubber pad with the former enclosed with a textile fabric cover. The seat can be readily removed for access to the battery box 13. The chair 5 is provided with left and right arm rests 8 and 9 and a back rest 7, each arm rest being connected to the corresponding side rails 10 and 11 whereof the latter are rigidly united by spaced cross bars 12. (See FIG. 3). The chair 5 is further provided with adjustable footrest supporting legs 14 and 15. The foot rest legs are also self-retractable should the occupant forget to adjust the angle of the foot rest legs clear of the lower frame 3, prior to climbing an excessively steep inclined stairway. As shown the chair 5 is sustained at opposite sides by two pairs of legs 16 and 17, the legs are fulcrumed respectively at 20 and 21 to fixed brackets 18 and 19 (See FIG. 11), secured to the corresponding side rails of the platform frame 2.

CHAIR STABILIZING ASSEMBLY

Figure 4:
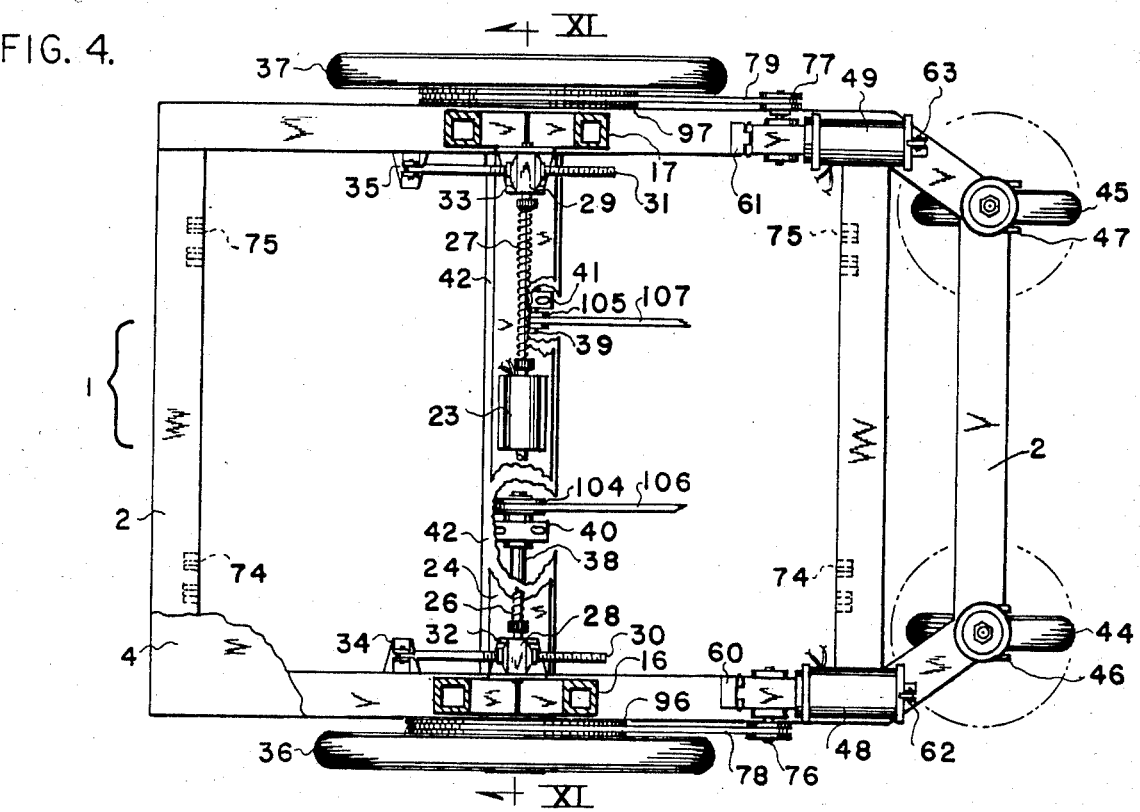
FIG. 4 is a horizontal view partly in section with parts broken away, taken as indicated along the angled arrows IV—IV in FIG. 1. Illustrating details of power drive train system, seat stabilizing assembly and the drive wheel and caster wheel assembly.
Figure 11:
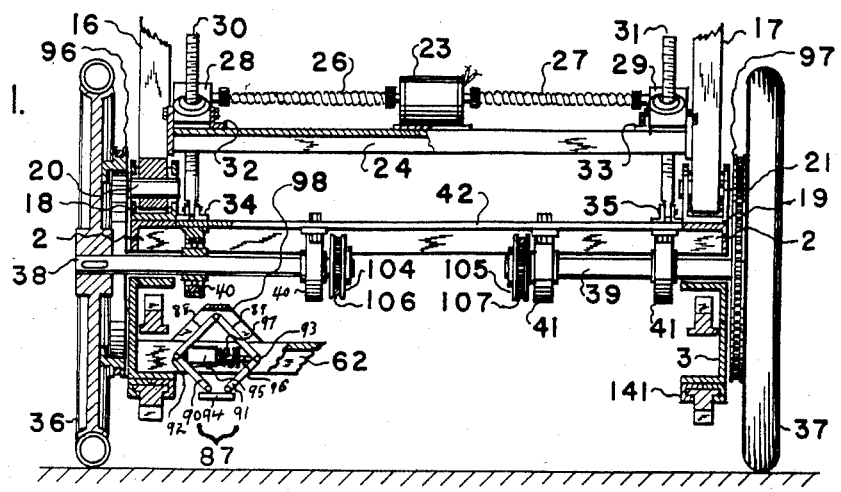
FIG. 11 is a vertical view partly in section taken as indicated along the angled arrows XI—XI in FIG. 4, illustrating the chair stabilizing drive assembly and a portion of wheel and tractor belt drive assembly and a synchronizing jack provided for synchronizing the tractor belt cleats in preparation for traversing the stairs.

As shown in FIGS. 1, 3 and more particularly FIGS. 4 and 11, the chair stabilizing assembly comprises a reversible motor 23, mounted on an angle bar 24, the latter is secured to both chair sustaining legs 16 and 17. The motor 23 is connected to a pair of flexible drive shafts 26 and 27, the latter in turn are connected to a pair of gear nuts 28 and 29. The gear nuts are comprised of a worm drive and worm gear, the latter is threadedly engaged to the threaded spindles 30 and 31. The gear nuts 28 and 29 are swiveley borne in brackets 32 and 33, the latter in turn are secured to the angle bar 24 and to triangular plates secured to the inboard side of the chair sustaining legs 16 and 17. The threaded spindles 30 and 31 are swiveley borne in brackets 34 and 35, the latter are in turn secured to the side rails of frame 2 (See FIG. 4). Accordingly, when the motor 23 drives the shafts 26 and 27 in one direction, the chair structure, as a whole, is moved forward about the fulcra 20 and 21 of the legs 16 and 17 and tilted relative to the platform 1, and when said motor and shafts are reversely rotated, the chair structure is moved rearwardly about said fulcra and oppositely tilted relative to the platform 1.

MODE CONVERSION JACK ASSEMBLY

In ordinary use for movement on level surfaces in or out-of-doors the conveyance is solely supported by four wheels, (See FIGS. 1, 2, 3, 4 and 11), the two drive wheels 36 and 37 being latterly spaced and disposed about midway of the length of the platform 1, respectively immediately outward of the side rails of frame 2. The drive wheels 36 and 37 are keyed to drive shafts 38 and 39, (SEE FIG. 11) the latter are suitably journaled in two pairs of pedestal bearings 40 and 41, the latter in turn are secured to the angle bar 42, the latter in turn is secured to the side rails of frame 2. The two caster wheels 44 and 45 have their respective yokes 46 and 47 pivotally secured to an extension of the side rails of frame 2.

Figure 5:
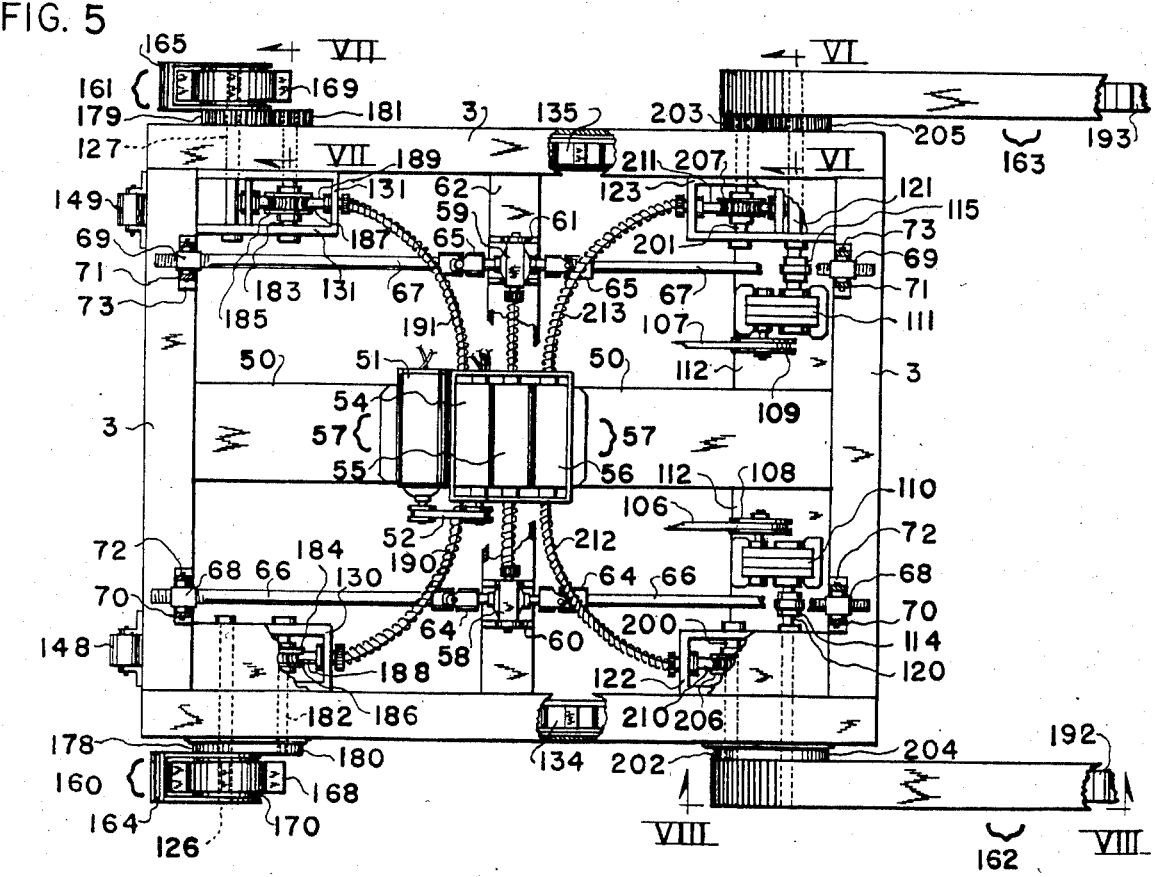
FIG. 5 is a horizontal view partly in section with parts broken away taken as indicated along the angled arrows V—V in FIG. 1. Illustrating details of the jack assembly, auxiliary tractor belt positioning assembly and a portion of the main and auxiliary tractor belt drive assembly.

The provisions made for converting the conveyance from a level surface mode as described above to a stair climbing mode are accomplished effortlessly by the occupant while remaining seated on the conveyance as noted in the following description: Referring to FIGS. 1 and 5, disposed longitudinally within the hollow of frame 3 is a jack assembly by which the frame 2 and the attached drive wheels 36 and 37 and the caster wheels 44 and 45 can be raised sufficiently above the roots of the cleated tractor belts to prevent the said wheels from striking the leading edges of the stairs as shown in FIG. 1. Referring to FIG. 5, a channel bar 50 is secured to the front and rear rails of frame 3, a reversible motor 51 drives a belt 52, the latter in turn drives a six-way transmission unit 57, also secured to the channel bar 50.

The transmission unit 57 is of a type available on the open market. The transmission 57 comprises three solenoid-actuated clutches which are embodied in their respective sections 54, 55 and 56. Each section has a pair of flexible drive shafts connected thereto. Referring now to transmission section 55, the flexible drive shafts are connected to gear nuts 58 and 59 in turn are pivotally connected to brackets 60 and 61, the latter in turn are secured to the channel bar 62, the bar 62 is secured to the side rails of frame 3. The gear nuts 58 and 59 have keyed thereto stub drive shafts protruding from each side, the latter in turn have a pair of universal joints 64 and 65 keyed thereon, the distal ends of the said universal joints are keyed to threaded drive shafts 66 and 67, the latter in turn are threadedly engaged to swivel nuts 68 and 69, the latter in turn are pivotally connected to four pairs of upper and lower toggle links 70 and 71, (see also FIG. 1) the distal ends of the lower links are pivotally connected to brackets 72 and 73, the latter in turn are secured to the front and rear rails of frame 3. The distal ends of the upper links are pivotally connected to brackets 74 and 75, (See also FIG. 4) the latter in turn are secured to the front and rear rails of frame 2. Upon operation of the transmission section 55 in one direction, it will be apparent that through the interposed jack assembly just described. Referring to FIGS. 2 and 3, the frame 3 with the attached tractor belt assembly will be extended downwardly until the belt cleats come to rest on a stair landing or other level surface then subsequently the frame 2 with attached drive wheels 36 and 37 and caster wheels 44 and 45 will be raised upwardly until the latter are clear of the roots of the tractor belts as previously mentioned and shown in FIG. 1. The foregoing description converts the conveyance to a stair traversing mode. It will be noted that when frame 3 is retracted upwardly toward frame 2 by the jack assembly a small amount of slack will occur in the timing belts 106 and 107, however in practice it may be necessary to install belt tensioning devices to keep the belts taught. The electrical instrumentalities controlling the above described jack assembly will be described later in detail.

MAIN PROPULSION ASSEMBLY

The main propulsion assembly is comprised of two independent drive assemblies. The principal purpose of the two independent drive assemblies are to facilitate steering the conveyance on a level surface and while ascending or descending stairs. When the conveyance is prepared for traveling in a level surface mode, one motor can be driven in reverse and the other motor driven in a forward direction causing the conveyance to turn completely around in a circle not larger than the center distance between the drive wheels 36 and 37 and a diagonal distance to either of the caster wheel yokes 46 and 47 while traversing regular or irregular stairs the same method of steering is accomplished but to a lesser degree in scope. A description of the two independent drive assemblies will be provided simultaneously as follows: The reduction geared drive motors 48 and 49 are secured to frame 2 at the forward end by hinges 60 and 61 and the rear end of said motor by a pair of over the center toggle clamps 62 and 63, (See FIGS. 1 and 4). The said drive motors are provided with timing belt pulleys 76 and 77 in turn drive timing belts 78 and 79. In the event of a power failure, the toggle clamps 60 and 61 could be released and the said motors tilted forwardly on said hinges, thereby disengaging the timing drive belts 78 and 79 (See FIG. 4) from the drive motor pulleys 76 and 77. The disengagement of the said timing belts and motor pulleys would permit the occupant to hand propel the conveyance in a conventional manner on level surfaces. Proceeding with the description of the drive assemblies, the before mentioned timing belts 78 and 79 drive the timing belt pulleys 96 and 97, the latter in turn are secured to the drive wheels 36 and 37 respectively, the latter in turn are keyed to the said drive shafts 38 and 39 respectively (See also FIG. 11), the latter in turn are suitably journaled in two pairs of pedestal bearings 40 and 41 as mentioned before. The timing belt pulleys 104 and 105 are keyed to their respective drive shaft 38 and 39, the pulleys 104 and 105 drive timing belts 106 and 107, the latter in turn drive timing belt pulleys 108 and 109 (See FIG. 5), the latter in turn drive a pair of parallel shaft double reduction worm gears 110 and 111, the latter in turn are secured to the channel bar 112, the latter in turn is secured to the channel bar 50 and the side and rear channel bars of frame 3. The output shafts of the reduction gears 110 and 111 have flexible couplings 114 and 115 keyed thereon, the latter in turn are keyed to the tractor belt drive shafts 120 and 121, the latter are suitably journaled in bearings supported by the corner brackets 122 and 123, the latter in turn are secured to the side, and rear rails of frame 3 (See FIGS. 5, 6 and 7).

TRACTOR BELT ASSEMBLY

As mentioned above, the tractor belt drive shafts 120 and 121 are further suitably journaled in bearings supported by the side rails of frame 3. (See FIGS. 6 and 7). The timing belt sprockets 124 and 125 are keyed to the shafts 120 and 121 on the inboard side of the side rails of frame 3. A pair of driven shafts 126 and 127 are suitably journaled in bearings supported by the forward corner brackets 130 and 131, the latter in turn are secured to the front and side rails of frame 3 in an identical manner as previously described for the tractor belt drive shafts 120 and 121. The timing belt sprockets 128 and 129 are keyed to the driven shafts 126 and 127 on the inboard sides of frame 3. Arranged along the inboard sides of the frame 3, are internally toothed and externally cleated endless tractor belts, 134 and 135, in turn trained respectively about the before mentioned timing belt sprockets 124, 125, 128 and 129. Each belt is formed in two permanently bonded layers, (See FIG. 8) the outer or cleated layers 134 and 135 are comprised of slip-resistant neoprene or similar material molded over timing belts 136 and 137, the latter has inbeded within stretch-proof stranded wire or fiber glass or similar materials at 138 and 139, this inner layer being available on the open market. The width of the outer layers 134 and 135 are narrower than the inner layers 136 and 137 in order to provide suitable lands for retention within the belt guide grooves 140 and 141, (See FIGS. 6, 7 and 11). The purpose of the restraining grooves is to prevent the belts 134 and 135 from running off of the said timing belt sprockets or turning over when subjected to erratic steering of the conveyance while traversing the stairs.

Secured to the lower flanges of the side rails of frame 3 are the before mentioned split low friction belt guides 140 and 141 secured as by screws 142 and 143 and the center retaining bar 144 as by screws 145. The purpose of the said split belt guides is to facilitate the installation over both sides of the previously mentioned belt lands on the inner timing belts 136 and 137. The upper inner surface 146 and 147 of the said belt guides 140 and 141 provides a low friction runner that bears down on the low friction faced teeth on the lower run of the internally toothed belts 136 and 137, (See FIGS. 7 and 8) the latter in turn bear down on the stair treads. In view of the fixed center distances between the said driven shafts 120 and 121 and the said driven shafts 126 and 127, respectively, (See FIG. 5) and the non-stretch quality of said timing belts and the belt guides, it is apparent that a certain amount of slack in the belts will be required to facilitate the installation of the belt and sprockets on the said drive and driven shafts and belt guides, therefore in practice a belt tensioning device may be required as illustrated in FIG. 8, thus comprising a gear 150 suitably journaled in bearings and supported by shaft 151, the latter in turn is supported by lever arm 152, the latter in turn is fulcrumed on shaft 153. The distal end of the lever arm 152 is provided with a swivel nut 154, the latter in turn is threadedly engaged to tensioning bolt 155, in turn supported by a self-adjusting concave washer 156 the latter is supported by bracket 157, the latter in turn is secured to the lower inner face of the channel bar.

Figure 17:
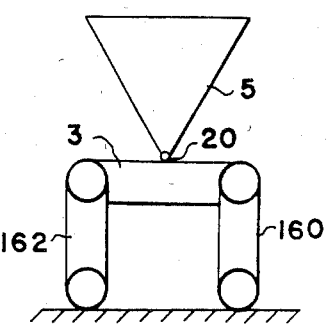
FIG. 17 is a diagrammatically view showing how the conveyance is maneuvered for access of the occupant to elevations beyong ordinary reach.

In order to better enable the conveyance to ascend or descend stairways or to travel over gutter curbs or other obstructions, I have made further provisions including a pair of auxiliary tractor units 160 and 161, (See FIGS. 1, 2, 3 and 5) at the front end of platform 1 and the side rails of frame 3; and another pair of auxiliary tractor units 162 and 163 at the rear end of the platform 1 and the side rails of frame 3. The frontal tractor units 160 and 161 comprises lever arms 164 and 165 which are swingable on bearings about the axis of the previously mentioned driven shafts 126 and 127 of the main horizontal tractor belts 134 and 135 as a fulcrum: The units 160 and 161 comprises endless tractor belts 168 and 169 which are trained about timing belt sprockets 170, 171, 172 and 173 respectively. The timing belt sprockets 170 and 171 are keyed to the driven shafts 126 and 127 respectively, the sprockets 172 and 173 are rotatively borne on stub shafts 174 and 175 the latter are secured to the distal ends of the lever arms 164 and 165 respectively. A pair of rollers 176 and 177 are rotatively borne in brackets 166 and 167, the latter are secured to the distal ends of the lever arms 164 and 165, the purpose of said rollers is to prevent the tractor belts 168 and 169 from damaging the carpet on the landings and are also used first when positioning the conveyance to reach a higher shelf as shown in FIG. 17. Another pair of rollers 148 and 149 are rotatively borne in brackets in turn secured to the front rail of frame 3, (See FIGS. 1 and 5) the purpose of said rollers is to disengage the cleats from the tread when reaching the lower landing. It is to be understood that the previously described belt guides 140 and 141 are identical to those that are attached to the outer sides of the lever arms 164 and 165. Secured by screws 218 and 219 to the lever arms 164 and 165 are spur gears 178 and 179 (See FIGS. 5 and 7) which mesh with pinions 180 and 181, the latter in turn are secured to drive shafts 182 and 183, the latter in turn are suitably journaled in bearings supported by the side rails of frame 3 and bearings supported by the corner brackets 130 and 131. The worm gears 184 and 185 (See FIG. 5) are keyed to shafts 182 and 183. The worm gears 184 and 185 mesh with worms 186 and 187 (not shown) the latter in turn are keyed to drive shafts 188 and 189, the latter are suitably journaled in radial and thrust bearings supported by corner brackets 130 and 131. The drive shafts 188 and 189 are driven by flexible drive cables 190 and 191, the latter are connected to the transmission section 54.

In addition to the two frontal tractor units, I have also provided similar tractor units 162 and 163 at the rear of frame 3. The units 162 and 163 comprises cleated endless tractor belts 192 and 193 which are trained about sprockets 194 and 195 and 196 and 197. The sprockets 194 and 195 are keyed to the drive shafts 120 and 121 of the main tractor belts, and the sprokets 196 and 197 are rotatively borne on stub shafts 198 and 199 the latter in turn are secured to the distal ends of lever arms 162 and 163, fulcrumed for swinging movement about shafts 120 and 121. Rotatively borne in the corner brackets 122 and 123 are shafts 200 and 201 having keyed thereon pinions 202 and 203 in mesh with spur gears 204 and 205, the latter in turn is secured to tractor units 162 and 163, as by screws 218 and 219, (See FIGS. 6 and 7).

The tractor units are free to rotate about the said drive shafts 120 and 121. The worm gears 206 and 207 are in mesh with worms 208 and 209, (not shown) the latter are keyed to short drive shafts 210 and 211 the latter are suitably journaled in radial and thrust bearings supported by corner brackets 122 and 124. The drive shafts 210 and 211 are connected to flexible drive shafts 212 and 213 in turn are connected to the transmission section 56. Upon operation of the transmission sections 54 or 56 in one direction, it will be apparent that through the interposed drive assemblies just described, the auxiliary tractor units 160 161, 162 and 163 may be rotated about their fulcra approximately one hundred eighty degrees as shown in FIGS. 2 and 17 or anyposition within the above range. The cover plates 214 and 215 are provided to cover the auxiliary tractor units 160, 161, 162 and 163. The cover plates 214 and 215 are recessed between the upper and lower flanges of the channel bars and are secured as by screws to the said tractor units, (See FIGS. 1, 6 and 8), the cover plates are provided with low friction bearings 216 and 217 (See FIG. 6) the latter in turn support the outboard sides of said tractor units on the said shafts 120, 121, 126 and 127.

SYNCHRONIZING JACK ASSEMBLY

A synchronizing jack 87 is installed adjacent to the left hand main tractor belt drive assembly. (See FIG. 11). The purpose of the synchronizing jack is to raise the main tractor belt from contact with the floor in order to synchronize the cleats of the left tractor belt group with the right tractor belt group prior to ascending or descending the stairs. The maneuvering of the conveyance on level surfaces where turning more in one direction than the other will de-synchronize the cleated tractor belts. The said jack 87 has a pair of upper toggle links 88 and 89, pivotally secured to bracket 98 the latter in turn is secured to the channel bar 62, a pair of lower toggle links 90 and 91 are pivotally secured to the said upper links at 92 and 93, the distal end of the links 90 and 91 are pivotally secured to a foot 94, a sucking solenoid 95 is pivotally secured at the toggle joint 92, and the solenoid plunger 96 is pivotally secured to toggle joint 93. When the solenoid 95 has been energized, it will draw the toggle joints 92 and 93 towards each other thereby extending the foot 94 into contact with the floor subsequently raising the left main tractor belt clear of the floor thence driving motor 48 until the subject cleats are in synchronization with the right hand idle tractor belt group. When the solenoid 95 is de-energized, the spring 97 will cause the toggle joints 92 and 93 to extend and retract the foot 94 clear of the roots of the main tractor belt.

ELECTRICAL CIRCUITRY

Figure 9:
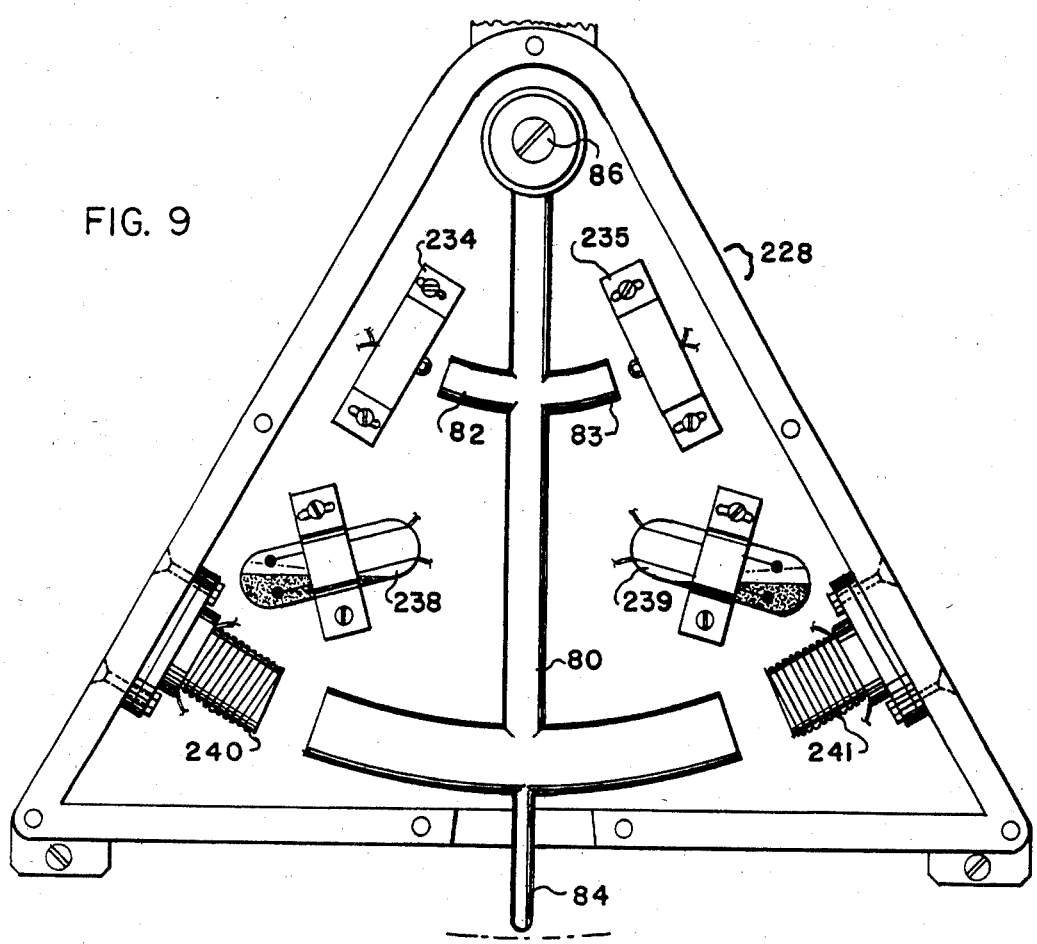
FIG. 9 is an enlarged side elevational view of the stabliling switch shown in FIG. 1, with the cover plate removed, illustrating a pendulum, mercury switches, solenoids and microswitches.
Figure 10:
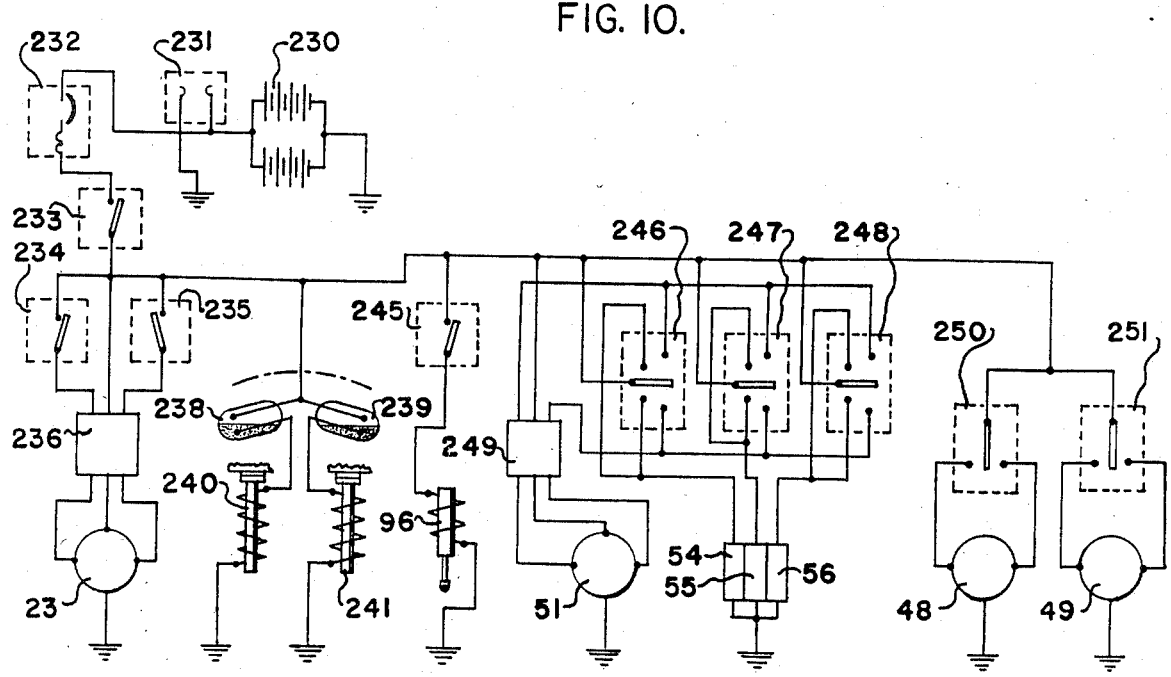
FIG. 10 is a wiring diagram of various electrical instrumentalities relied upon for effecting and controlling operation of the conveyance by power.

Referring to FIG. 9 the automatic stabilizing switch 228 and the schematic wiring diagram of FIG. 10, the electric current for energizing motors 23, 51, 48 and 49 and other electrical components are supplied by batteries 230. Included in the circuitry are a battery charger receptical 231, a circuit breaker 232, a manually operable main switch 233, a pair of micro-switches 234 and 235, a motor relay 236, a pair of mercury switches 238 and 239, and a pair of solenoids 240 and 241. Referring now to FIG. 1, the stabilizing switch 228 is secured to seat frame 6 and angle bar 22 the latter is secured to the chair sustaining legs 16. Referring now to FIGS. 9 and 10, the enlarged stabilizing switch has the access cover removed illustrating a pendulum 80 with integral lugs 82 and 83 and a hand actuating lever 84. The pendulum 80 is rotatively borne on shaft 86, the latter is secured to the stabilizing switch case 228. When the conveyance commences to descend the stairs, the platform 1 will begin to assume the angularity of the stairs, the pendulum 80 will remain in a perpendicular position, when the platform and chair assume an angle of approximately five degrees, the mercury in the switch 238 will bridge the contacts and energize the solenoid 240. When within the sphere of influence of the latter the pendulum 80 will be pulled into contact with the core of solenoid 240. Simultaneously the pendulum lug 82 will close the microswitch 234, thereby energizing relay 236 and motor 23, the latter in turn will drive the said intervening mechanical components and cause the chair to rotate about the said fulcra until the chair assumes a perpendicular position thereby the mercury in switch 238 has sought its original position, opening the circuit to the solenoid 240 thus releasing the pendulum 80 to assume its original perpendicular position thus, permitting the spring urged microswitch 234 to open the circuit to the relay 236 and the motor 23. Conversely when the platform 1 commences to ascend the stairs, the mercury switch 239 energizes solenoid 241, drawing the pendulum 80 and lug 83 into contact with the solenoid 241 and microswitch 235 respectively, thereby energizing relay 236 to drive the motor 23, the intervening mechanical components and the chair in the opposite direction. In the event of a malfunction to any of the components of the stabilizing switch 228, a hand operated lever 84 which is an extension of pendulum 80 could be manipulated to stop or counteract an excessive chair movement. It will be apparent from the above description that each time the inclination of the platform 1 changes approximately five degrees in either direction the stabilizing switch 228 will automatically cause the chair to return to a perpendicular position. Provisions have been made to adjust the said mercury and microswitches to cause the activation of the chair stabilizing means in increments of more or less than the said five degrees. Referring now to FIG. 10, the manually operable switch 245 will energize the synchronizing jack 87 thereby (See also FIGS. 4 and 11) permitting the synchronization of the beforementioned tractor belt cleats. The switch 245 is secured to the left arm rest 8, (See FIG. 1). Referring now to FIG. 10, the manually-operable double throw switches 246, 247 and 248 are secured to the left arm rest 8 (See also FIG. 1). When the occupant wishes to lower or raise the front end of the platform, switch 246 is pressed in the desired direction which energizes relay 249 motor 51 and solenoid actuated transmission section 54, (See also FIG. 5) and cause through the said intervening mechanical components, the auxiliary tractor units 160 and 161 to rotate about their fulcra, similarly by pressing switch 248 to energize relay 249, motor 51 and solenoid actuated transmission section 56. The rear auxiliary tractor units 162 and 163 can be moved about their fulcra, to raise or lower the rear end of the platform. By pressing the switch 247 a circuit is established to relay 249, motor 51 and solenoid actuated clutch in transmission section 55 for rotation of the latter in the proper direction for motivation of the jack assembly for conversion of the conveyance from a level surface mode to a stair climbing mode or conversely as previously described. By pressing manually-operated switches 250 and 251 in the same direction for forward travel, the motors 48 and 49 will drive their respective drive wheels 36 and 38, main tractor belts 134 and 135, auxiliary tractor belts 168, 169, 192 and 193 through previously described mechanical components, pressing the switches 250 and 251 in the opposite direction will result in reversal of the said motors 48 and 49, for reverse driving of all drive wheels main and auxiliary tractor belts, for rearward progression of the conveyance. Throwing one switch in one direction and the other switch in the opposite direction will cause the drive wheels, main and auxiliary tractor belts to be oppositely driven to turn the conveyance in one direction; and upon reversely positioning the switches, to cause said conveyance to move in the other direction.

Figure 12:
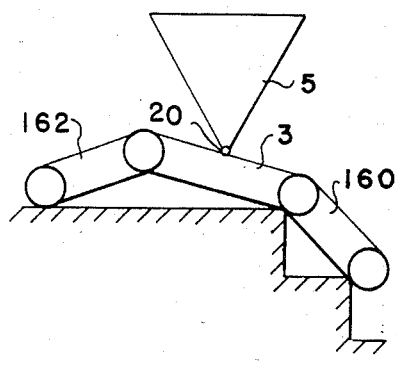
FIGS. 12-16 are diagrammatic views showing the diversified manner in which the conveyance is maneuvered by the occupant incident to descending or ascending the stairways.
Figure 13:
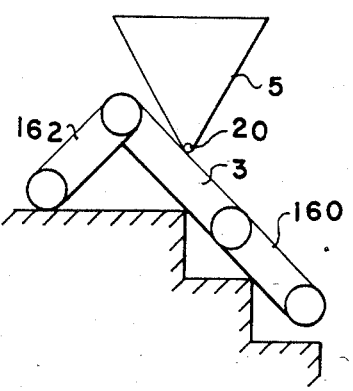
Figure 14:
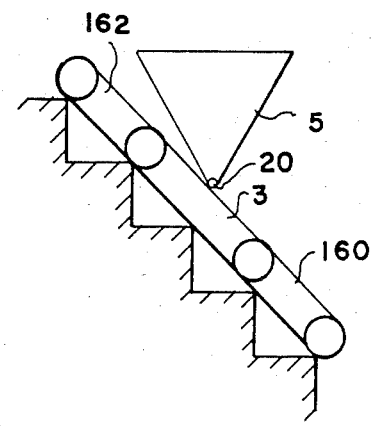
Figure 15:
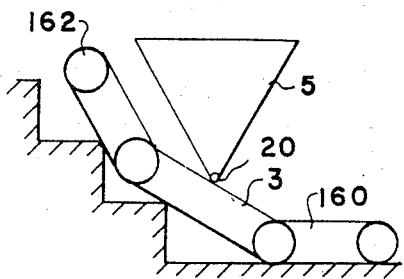
Figure 16:
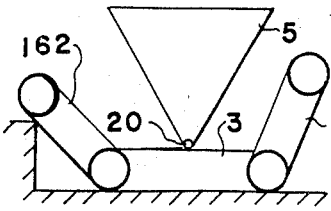

The procedure by which the conveyance is operated and controlled in descending a stairway is as follows: Assume that the main tractor belts 134, 135, auxiliary tractor belts 168, 169, 192, and 193 are being driven concurrently under power in FIG. 12, to advance the conveyance, the occupant of the chair, by means of the electric controls, hereinbefore described causes the frontal tractor units 160 and 161 to gradually assume an inclined position corresponding to the angularity of the stairway and the rear tractor belt units 162 and 163 to be swung counterclockwise until the main tractor belts 134 and 135 likewise assume an angular position corresponding to the inclination of the stairway as in FIG. 13. As the center of gravity of the occupant and conveyance pass over the leading edge of the landing in its descent, the chair occupant then causes the rear auxiliary tractor belt units 162 and 163 to gradually assume the angularity of the stairway as in FIG. 14. During ascent or descent of the conveyance, slippage is effectively prevented by frictional co-action between the cleats of the several tractor belts with the edges of the stair treads, one belt cleat on each side in contact with any one step will hold occupant and conveyance safely on the stairs, as will be readily understood. As the lower floor is approached the main tractor belts 134 and 135 and the auxiliary tractor belt units 160, 161, 162 and 163 are caused to successively assume the relative angular positions of FIGS. 15 and 16 for the safe landing of the chair occupant. During stair ascent and descent the chair and occupant are automatically maintained in a perpendicular position regardless of the angularity assumed by the platform 1 by automatic chair stabilization means as heretofore described. Stair ascension is accomplished by reversal the above procedure.

In a similar way, the conveyance is capable of ascending or descending regular or irregular stairs as well as being moved in confined spaces, such as L and U type landings by converting the conveyance to level surface mode, which is accomplished by pressing the switch 247, then the drive wheels 36, 37 and caster wheels 44 and 46 are lowered to the landing and the main tractor belts 134 and 135 are retracted clear of the landing and thence by pressing the switches 246 and 247, the tractor units 160, 161, 162 and 163 are caused to be rotated about their respective fulcra until positioned in a perpendicular manner asshown in FIG. 2.

In the event of power failure during stair ascent or descent, the conveyance will be prevented from slipping due to frictional grip at the cleated tractor belts with the stairs and locking of belt transmission mechanisms by the worm gearing involved therein. Moreover with the tractor belts or wheels in contact with the floor, the conveyance is prevented from moving as the occupant enters or leaves the chair. Complete safety is thus assured to the user of the conveyance.

Steering the chair while ascending or descending can be accomplished by merely relaxing a finger on either switch 249 or 248. This will cause the energized motor and its tractor belt train to move the conveyance toward the de-energized motor and belt train.

It will be appreciated that a conveyance constructed in accordance with my invention is capable of negotiating irregular stairs as well as regular stairs at inclinations up to fifty-five degrees but not limited thereto.

Withe the conveyance arranged as in FIG. 2 the frontal tractor belt units 160 and 161 can be rotated 180 degrees in an anti-clockwise direction and the rear tractor belt units 162 and 163 can be subsequently rotated 180 degrees in a clockwise direction about their respective fulcra 120, 121, 126 and 127, to the vertical positions of FIG. 17 to raise the platform 1 for access of the chair occupant to shelves, for example, at elevations beyond ordinary reach of an occupant in a conventional wheel chair. The conveyance of my invention can also be power propelled and steered by the rear tractor belts 192 and 193 when elevated to the position shown in FIG. 17. By omitting the chair and the activating mechanism therefore, it is possible to use the conveyance as a truck by placing the articles to be transported upon the platform and causing the power of the jack mechanism and tractor belts 134 and 135 to be controlled and operated for stair ascension or descension in factories or stores or travel up and down ramps in loading or unloading delivery trucks or the like. When the conveyance is adapted for these purposes, it is to be understood that the batteries and the control switches for the conveyor belt drive and jack mechanisms will be mounted in such a way as to leave the platform free of obstruction and yet readily accessible to the user.

In certain cases a handicapped or invalid person may require the need for an attendant to operate the conveyance. It can be readily understood that the conveyance can be driven backwards up the stairs with the attendant facing the occupant and the stairs. In descending the stairs the attendant may face the occupant and stairs and walk down backwards. The electrical controls are secured to the front end of the arm rests and are readily accessible to the attendant; however, if more freedom of movement is desired, an electrical extension cord and hand held switch control box could be provided.

Although only one exemplary embodiment of the invention has been disclosed herein for the purposes of illustration, it will be understood that various other changes, modifications and substitutions may be incorporated without departing from the spirit of the invention as defined by the claims which follow.

I claim as my invention:

1. In a load carrying conveyance, the combination of:
   (a) a platform to receive the load;
   (b) main drive and caster wheels supporting the platform for mobility;
   (c) main endless belt tractor means supporting the platform for mobility;
   (d) lever means carrying auxiliary endless belt tractor means disposed on pivots forwardly and rearwardly on the platform and outwardly off-set from the main tractor means and said platform to be operatively clear of said main tractor means and platform to permit rotation of said auxiliary tractor means without interference contact with said main tractor means or platform;
   (e) power mechanism manually controllable by an operator for driving the drive wheels and the several tractor means, with said power mechanism operatable at a constant speed;
   (f) rotational means for rotating said lever means concentrically positioned with said pivots and means for driving said rotational means; and
   (g) mode conversion jack means manually controllable by the platform occupant for lowering the main endless belt tractor means until said main endless tractor belt means are in contact with the floor, and subsequently raising the main drive and caster wheels above the roots of the main endless tractor belt means, thus simultaneously converting the conveyance from a higher speed, level surface mode, to a lower speed, higher torque, stair climbing mode or vice versa, while remaining engaged to the main power mechanism operating at constant speed.

2. A conveyance according to claim 1 wherein said belts are formed of non-stretchable material with teeth on their outer surfaces for preventing slippages in outer surface engagements and also teeth on the inner surface trained about end sprockets for preventing slippage on the inner surface engagement; belt tensioning devices are provided to facilitate installation of said belts.

3. A conveyance characterized as in claim 1, wherein the main tractor means comprises a pair of toothed endless belts, one at each side of the platform trained about sprockets on axes at opposite ends of the platform; wherein each auxiliary tractor means comprises a pair of toothed endless belts, each such belt being trained about end sprockets.

4. A conveyance according to claim 1, further characterized by means including a pair of laterally spaced retractable wheels on a transverse axis located substantially equally distant between the front and rear ends of the platform and a pair of retractable coordinated caster wheels pivotally mounted outside of said platform rearwardly of said first mentioned wheels and means for power driving the first mentioned wheels concurrently for forward or rearward propulsion of the conveyance or individually for turning the conveyance either rightward or leftward, or concurrently driving the wheels in opposite directions to swing the conveyance on a minimum radius.

5. A conveyance according to claim 4, wherein the platform is hollow and open from beneath and wherein a pair of drive and caster wheels are secured to the perimeter of said platform with capacity for retraction and extension in relation to the main belt tractor means.

6. A conveyance in accordance with claim 4, further including rotatable power-actuated means, subject to manual control by the seated occupant, whereby the platform and the surmounted chair can be raised through rotation of said power actuated means for access of the occupant to objects at elevations beyond ordinary reach of a seated person.

7. A conveyance in accordance with claim 6, wherein the power-actuated elevating means comprises lever elements fulcrumed respectively to the front and rear ends of the platform and provided respectively at their distal ends with wheels; and wherein the power means is functional to swing the lever elements downwardly about their pivots from normally raised idle positions into floor engaging positions to raise the platform and the chair for access of the occupant to objects at elevations beyond ordinary reach of a seated person.

8. A conveyance according to claim 4, further having endless belt tractor means, one at each side of the platform normally out of floor contact; power-operable jack means controllable manually by the occupant of the chair, to lower the said tractor means until the tractor belts contact the floor, and subsequently the pair of drive and caster wheels are retracted until clear of the tractor belt roots; and power means also subject to manual control by the occupant in the chair for driving the tractor belts simultaneously in one direction or the other to move the conveyance either forwardly or rearwardly or individually for steering purposes.

9. A load-carrying conveyance according to claim 1 wherein the individual belts are constrained to side movement in downwardly open low friction belt guides which bear down in supporting relation with the upper surface of the floor-engaging portions of the belts and of which the split side flanges downwardly overlap the opposite sides of the widened portions of the respective belts.

10. A conveyance characterized as in claim 9, wherein the inner teeth of the respective belts are formed on non-stretchable strip material; and wherein said strip material is permanently bonded to an outer layer of toothed pliant strip material molded from tough wear-resistant synthetic rubber or the like.

11. In a conveyance for invalids the combination of:
(a) a platform surmounted by a chair for the user;
(b) main drive and caster wheels supporting the platform for mobility;
(c) main endless tractor belt means supporting the platform for mobility;
(d) lever means carrying auxiliary endless belt tractor means, disposed on pivots respectively forwardly and rearwardly on the platform and outwardly off-set from said main tractor means and said platform to be operatively clear of said main tractor means and platform to permit rotation of said auxiliary tractor means without interference contact with said main tractor means or platform, with each of said lever means swingable individually through a range of substantially 180°;
(e) reversible power driven mechanisms under manual control of the chair occupant for driving the wheels and several tractor means;
(f) rotational means for rotating said several lever means concentrically positioned with said pivots and means for driving said rotational means; and
(g) a pair of rollers attached to the forward lever means to prevent damage to carpets when transiting the upper landing or when positioning the conveyance to permit the occupant to reach a higher shelf than possible from a conventional wheel chair.

12. A conveyance according to claim 11, wherein the chair is pivotally supported on the platform, and further comprising automatic means for titlting the chair forwardly or rearwardly relative to the platform during stair ascent or descent to maintain the chair and occupant always in an upright position, said means comprising a normally quiescent reversible electric motor, actuating mechanism interposed between the motor and a pair of normally open microswitches, a pair of normally inactive mercury switches, a pair of normally inactive solenoids and a pendulum swingable about a pivot; all of the above mounted on the chair and in circuit with the motor, the pendulum, one microswitch, one mercury switch and one solenoid serve to automatically close the circuit for operation of the motor in one direction during ascent of a stairway to tilt the chair forwardly for maintenance of the chair in upright position, and the other similar opposing switches, solenoid and the same pendulum serving to automatically close the circuit for reverse operation of the motor during descent of the stairway likewise for maintenance of the chair occupant in upright position.

13. A conveyance characterized as in claim 11, wherein the several tractor belts are provided with teeth spaced to react with the edges of the stair treads during stair ascent or descent.

14. A conveyance characterized as in claim 11, wherein the chair is fulcrumed to the platform on a transverse pivot axis and further including automatically activated power means for tilting the chair forwardly or rearwardly on said axis during stair ascent or descent to maintain the chair and occupant always in upright position.

15. A conveyance characterized as in claim 14, wherein the seat of the chair is supported on opposite sides by two legs in the form of levers fulcrumed at their bottom ends on the pivot axis, and wherein the automatically actuated power means serves to move the legs in one direction or the other about the common pivot axis for maintenance of the chair and its occupant upright during stair ascension or descension.

16. A conveyance characterized as in claim 11 wherein said endless belt tractor means are in the form of toothed belts and are trained respectively about end sprockets and having teeth spaced for engaging the edges of the stair treads; and wherein worm gearing is involved in the power means and the mechanism locked to hold the conveyance against displacement on the stairs in the event of power failure during ascent or descent.

17. In a conveyance for invalids the combination of:
(a) a hollow platform surmounted by a seat for an occupant;
(b) a pair of laterally spaced power driven side wheels and a pair of laterally spaced caster wheels longitudinally spaced from the side wheels by which the platform is supported ordinarily;
(c) means operable manually by the occupant of the chair for driving the first mentioned wheels concurrently for forward or rearward propulsion of the conveyance, or individually to turn the conveyance either rightward or leftward or concurrently driving the wheels in opposite directions to obtain a minimum turning radius;
(d) main endless tractor belts arranged respectively along opposite sides of the platform and trained about sprockets at the front and rear ends of the platform with their lower runs normally out of floor contact;
(e) power operable jack means manually controllable from the chair for extending the main tractor belt assembly downwardly into contact with the floor, subsequently retracting the aforesaid wheels and platform upwardly until the said wheels are clear of the roots of the tractor belts thus permitting the cleated tractor belts to fully engage the leading edges of the stairs;
(f) a pair of endless auxiliary tractor belts each trained about a pair of sprockets, one of which is coaxial with one of the frontal sprockets of the main tractor belts and the other of which is rotatably borne at the distal end of an arm fulcrumed on the axis of the corresponding frontal sprocket of the main tractor belts;
(g) a second pair of endless auxiliary tractor belts each trained about sprockets one of which is coaxial with one of the rear sprockets of the corresponding main tractor belts and the other of which is rotatively borne at the distal end of an arm fulcrumed on the axis of the rear sprocket of the corresponding main tractor belt;
(h) power means controllable from the chair for swinging the auxiliary frontal and rear tractor belt units downwardly from normal substantially upright idle positions into active angular positions in preparation for and during ascent or descent of stairways or the like by the conveyance; and
(i) power means controllable by the occupant of the chair for driving the main and auxiliary tractor belts concurrently to effect stairway ascent or descent.

18. A conveyance according to claim 17, further including means for automatically maintaining the chair upright during stair ascent and descent.

19. In a conveyance for invalids, the combination of:
a platform;
a pair of drive wheels mounted on the platform;
a pair of driven timing belts connected to the respective drive wheels;
a pair of main endless tractor belts carried on forward and rearward sprocket wheels mounted on forward and rearward shafts, respectively;
a pair of main propulsion drive motors hingedly mounted to the platform at one end and releasable by toggle clamps at the other end to permit disengagement of said motors from the driven timing belts to permit the occupant to hand propel the conveyance in the event of a power failure;
interconnected drive trains from the drive motors to the drive wheels;
a synchronizing jack means for raising one of the main tractor belts from floor contact, thence driving said main tractor belt until its cleats are synchronized with the other idle main tractor belt prior to ascension or descension of the stairs or the like; and
a pair of parallel shaft double reduction worm gears driven by the drive trains;
with the main tractor belts being driven by the drive trains and double reduction worm gears.

20. A conveyance as defined in claim 19, including
a battery; and
a chair having a frame, side arms, an adjustable back rest,
a removable seat permitting access to the battery,
adjustable foot rests, and
electrical switches for use in operating the conveyance,
with the switches located on the side arms and with the battery supported by the chair frame.

21. A conveyance as defined in claim 20, wherein the platform is sustained for mobility by a pair of laterally spaced side wheels and coordinated caster wheels longitudinally spaced from said side wheels; and
including means power operable by the occupant of the chair to drive the side wheels concurrently for forward or rearward propulsion of the conveyance and to drive the side wheels individually to turn the conveyance either rightward or leftward, including concurrently driving the side wheel in opposite directions to obtain a minimum turning radius.

22. A conveyance as defined in claim 21, wherein the platform is hollow and
the main endless tractor belts are positioned one at each side of the platform and trained about sprockets at opposite ends of the platform, said belts being normally out of floor contact; and including
mode coversion power jack means manually controllable by the chair occupant for extending the tractor belts until the main tractor belts are in contact with the floor and thence retracting the drive wheels; and
reversible power means, also manually controlled by the chair occupant, for driving the tractor belts for forward or rearward progression of the conveyance as the latter assumes a stair climbing mode.

23. A conveyance as defined in claim 22, further including
a pair of endless auxiliary frontal tractor belts, disposed with one at each side of the conveyance and trained about sprocket wheels affixed to the shafts of the forward sprocket wheels of the corresponding main tractor belts, and about sprocket wheels at the distal ends of forward lever arms fulcrumed on the shafts of the forward sprocket wheels of the main tractor belts;
a pair of auxiliary rear tractor belts, disposed with one at each side of the conveyance and trained about sprocket wheels affixed to the shafts of the rearward sprocket wheels of the corresponding main tractor belts, and about sprocket wheels at the distal ends of rearward lever arms fulcrumed on the shafts of rear sprocket wheels of the main tractor belts;
first reversible power means manually controllable by the chair occupant for swinging the frontal auxiliary tractor belts forwardly and downwardly from a normal idle upright position into operative floor engaging position, or upwardly into vertical relation to the platform when the conveyance is to be stored or transported; and second reversible power means manually controllable by the chair occupant for swinging the rear auxiliary tractor belts rearwardly and downwardly from a normal idle upright position into operative floor engaging position, or upwardly into vertical relation to the platform.

24. A conveyance as defined in claim 23, wherein the main tractor belts are disposed internally of opposite sides of the platform; and wherein the auxiliary frontal and rear tractor units are disposed outwardly of opposite sides of the platform.

* * * * *